United States Patent [19]

Hung et al.

[11] Patent Number: 5,021,068

[45] Date of Patent: Jun. 4, 1991

[54] TINTED CONTACT LENS AND METHOD OF MANUFACTURE THEREOF: REACTIVE DYE AND QUATERNARY PHOSPHONIUM SALT

[75] Inventors: William M. Hung; Kai C. Su, both of Alpharetta, Ga.

[73] Assignee: Ciba-Geigy Corporation, Ardsley, N.Y.

[21] Appl. No.: 563,768

[22] Filed: Aug. 7, 1990

Related U.S. Application Data

[63] Continuation-in-part of Ser. No. 468,025, Jan. 22, 1990, which is a continuation-in-part of Ser. No. 323,355, Mar. 14, 1989, Pat. No. 4,954,132.

[51] Int. Cl.$^5$ .................. D06P 5/00; C09B 62/04
[52] U.S. Cl. .................................. 8/507; 8/509; 8/543; 8/549; 8/584
[58] Field of Search ............... 8/507, 543, 549, 584

[56] References Cited

U.S. PATENT DOCUMENTS

| | | | |
|---|---|---|---|
| 3,887,329 | 6/1975 | Hegar et al. | 8/527 |
| 4,313,732 | 2/1982 | Teague et al. | 8/541 |
| 4,468,229 | 8/1984 | Su | 8/507 |
| 4,553,975 | 11/1985 | Su | 8/507 |
| 4,559,059 | 12/1985 | Su | 8/507 |
| 4,929,250 | 5/1990 | Hung et al. | 8/507 |
| 4,954,132 | 9/1990 | Hung et al. | 8/507 |
| 4,963,160 | 10/1990 | Hung et al. | 8/507 |

*Primary Examiner*—A. Lionel Clingman
*Attorney, Agent, or Firm*—Edward McC. Roberts

[57] ABSTRACT

An improvement in a process for preparing a contact lens tinted over at least a portion of its surface, having the steps of forming a tinting solution having a reactive dyestuff and applying the tinting solution to a polymeric hydrogel contact lens material, wherein the improvement comprises adding an effective amount of an ammonium or phosphonium quaternary salt to the tinting solution before the applying step.

13 Claims, No Drawings

TINTED CONTACT LENS AND METHOD OF MANUFACTURE THEREOF: REACTIVE DYE AND QUATERNARY PHOSPHONIUM SALT

FIELD OF THE INVENTION

The present invention relates to an improvement in the tinting of contact lenses. Successful methods of tinting contact lenses are set forth in U.S. Pat. No. 4,468,229, U.S. Pat. No. 4,553,975 and U.S. Pat. No. 4,559,059, all to Su, and these patents are incorporated herein by reference.

BACKGROUND OF THE INVENTION

The present invention relates to an improvement in a process for preparing a tinted contact lens. In particular, the invention concerns contact lenses comprising polymeric lens material in which reactive dyestuffs have been covalently bonded to monomer units of the polymer backbone. This invention is of particular interest in the area of so-called hydrophilic or "soft" contact lenses, commonly referred to as hydrogel lenses.

There are many known methods for tinting or coloring contact lenses. For example, a coloring agent, such as dyestuff or pigment, may be dispersed in a monomer precursor or polymer matrix. This method is typically unsuitable for use in hydrophilic contact lenses, however, because the coloring agent leaches from the plastic upon presence of water in the lens.

Another known method of coloring lenses is printing or otherwise applying the coloring agent to the lens surface. This method is also problematic, because a portion of the agent often becomes dissociated from the lens when the lens is placed in water. The primary cause of this problem is insufficient physical adhesion of the coloring agent to the surface. To counteract this problem, it is necessary to use a large amount of agent in the coloring process.

OBJECT OF THE INVENTION

It is an object of the invention to provide an improved tinting process for the fiber reactive dyes in the contact lens tinting field.

It is another object of the invention to provide improved tinted lenses using the aforementioned process.

SUMMARY OF THE INVENTION

Surprisingly, the bonding of a reactive dyestuff to polymeric lens material may be enhanced by providing an effective amount of an ammonium or phosphonium quaternary salt during the tinting process. Examples of acceptable ammonium quaternary salts include triethylbenzylammonium chloride, tetrabutylammonium hydrogen sulfate, phenyltrimethylammonium chloride, benzyltributyl ammonium chloride, tetrabutylammonium bromide, and tetramethylammonium chloride. Examples of acceptable phosphonium quaternary salts include the tetra-($C_1$-$C_4$-alkyl)-phosphonium halides; especially the bromide and chloride salts. It has been found that the use of such a catalyst results in increased bonding of the dyestuff to the lens material, which in turn decreases the cost of producing a tinted lens and also provides a lens having enhanced coloring. The present improvement has been found to be particularly useful in bonding chlorotriazine dyestuff to lens material.

DETAILED DESCRIPTION OF THE INVENTION

According to the present invention, a process for preparing a contact lens tinted over at least a portion of its surface may be improved by the presence of a quaternary ammonium or phosphonium salt catalyst in the tinting solution during the tinting procedure.

In most tinting procedures, such as those set forth in the aforementioned patents to Su, a solution of an effective amount of a reactive dyestuff is covalently bonded to the monomer units of polymeric lens material. For example, a practitioner may place a preformed contact lens in a tinting solution. In a standard tinting procedure, a contact lens is rinsed with deionized water and placed in a dry vial. Base solution (typically 10% $Na_3PO_4 \times 12H_2O$ (aq) solution) is added to the vial, followed by tinting solution. The vial is shaken in a shaker bath, and the lens removed. The lens is rinsed with deionized water and extracted with 10% glycerine (aq) solution at 80° C. for two hours. The lens is once again rinsed with water, then stored in saline. The quaternary ammonium salt catalyst of the present invention is preferably provided in the tinting solution prior to placement of the lens material therein.

A number of ammonium quaternary salts may be used in practicing the present invention, including

$$[A]_w[B]_z[C]_t[E]_vN^+Q^- \qquad (I)$$

where each of w, z, t and v is 0–4 and $w+z+t+v=4$.

Q is a counterion selected for $HSO_4^-$, $F^-$, $Cl^-$, $Br^-$, $I^-$, $CH_3COO^-$, $OH^-$, $BF_4^-$, $-SO_3^-$, $PF_6^-$, and $H_2PO_4^-$.

A, B, C, and E are each selected from $C_{1-18}$alkyl, preferably $C_{1-7}$alkyl, more preferably $C_{1-4}$alkyl, phenyl or phenyl-$C_{1-4}$alkyl, in which the phenyl ring is unsubstituted or substituted by $C_1$-$C_8$alkyl, $C_1$-$C_8$alkoxy, halo, hydroxy, phenoxy, nitro, carboxy, acetamido, phenyl, or benzyl, cycloalkyl having 5–6 ring members, for example, tri-$C_{1-4}$alkylbenzylammonium$_2$ chloride, triethylbenzylammonium chloride, tetra$C_{1-4}$alkylammonium hydrogen sulfate, especially tetrabutylammonium hydrogen sulfate, phenyltri$C_{1-4}$alkylammonium chloride, especially phenyl trimethylammonium chloride, benzyltri$C_{1-4}$alkylammonium chloride, especially benzyltributylammonium chloride, tetra$C_{1-4}$alkylammonium bromide, especially tetra butyl ammonium chloride or bromide, and tetraethylammonium chloride or bromide.

The phosphonium quaternary salts utilized in the inventive process include tetra-($C_1$-$C_4$-alkyl)-phosphonium salts. The halide salts are especially useful; especially the bromide and chloride salts.

In general, any polymeric material suitable for use in the preparation of a contact lens can be used in the present invention, so long as at least one of the monomeric components which form the material contains an exoskeletal functional group which can react with a reactive dyestuff molecule. Examples of such functional groups commonly present in contact lens materials are the hydroxyl, amino, amido, thio and carboxy groups, and functional derivatives thereof. Particularly suitable as monomers for this purpose are hydroxyalkyl esters of polymerizable unsaturated acids, such as acrylic, methacrylic, itaconic, fumaric and maleic acids. Among such esters, hydroxyethyl methacrylate (HEMA) has been used quite extensively.

Useful reactive dyes, according to the present invention, include those commonly referred to as "reactive dyes forming ether linkages". These dyes contain reactive groups which react with cellulose to form an ether linkage and are generally described in *Fiber-Reactive Dyes*, Chapter VI, by W. F. Beech, SAF International, Inc., New York (1970), incorporated herein by reference. U.S. Pat. No. 4,553,775 to Su also sets forth typical examples of commercially available dyes which may be used in accordance with the present invention.

Among the preferred reactive dyestuffs capable of being used in accordance with the present invention are those having the general formulae:

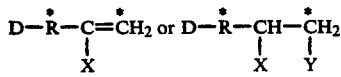

wherein

D is the radical of an organic dyestuff radical;

R is a divalent organic electron attracting group capable of causing electron withdrawal of the carbon atoms to which it is attached directly or through a conjugated system, thus activating the same;

X is hydrogen or halogen, including F, CL, and Br; and

Y is a leaving group or mixtures thereof.

The radical D may advantageously be the radical of an azo, phthalocyanine, azomethine, nitro or anthraquinone dye.

The divalent group —R— is advantageously bonded directly to an aromatic nuclear carbon of D, or is bonded thereto via an aliphatic group such as an alkylene group, e.g., a lower alkylene group. Most preferably, —R— is directly bonded to a nuclear carbon atom of D.

Suitable divalent R groups include —CO—, —SO$_2$—, —SO—, —NHCO—, —NHSO$_2$—, —SO$_2$NH— and the like. Most preferably, —R— is —SO$_2$—, —SO$_2$NH—, —CO— or —NHCO—.

When x is halogen, it is most preferably chloro or bromo.

Suitable leaving groups, Y, include —Cl, —Br, —OH, di-lower alkylamino,

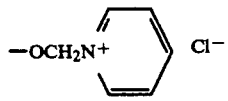

—SO$_2$—phenyl, —OSO$_3$—Z$^+$ where Z is a cation such as Na+, —O—SO$_3$R$_1$ or —OSO$_2$R$_1$ where R$_1$ in each case is alkyl, aryl, aralkyl or alkaryl.

Advantageously, where R$_1$ is alkyl, it is alkyl of 1 to 6 carbon atoms, preferably alkyl of 1 to 4 carbons, including for example, methyl, ethyl, isopropyl, butyl and the like. Where R$_1$ is aralkyl, it is preferably lower alkyl substituted phenyl, such as tolyl or xylyl, and where R$_1$ is alkaryl, it is preferably lower alkylenephenyl, such as benzyl or phenethyl.

Also, the use of halotriazine dyes, especially chlorotriazine dyes, such as Cibacron® Blue 3R available from Ciba Geigy Corporation, is contemplated by the present invention. These are typically of the formula

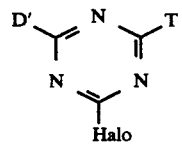

where D' is a radical of an organic dyestuff bound directly to the triazine ring or through a suitable linker, T is a solubilizing moiety, halo or another D', and halo is a halogen atom, preferably fluorine, chlorine, or bromine, more preferably fluorine or chlorine, most preferably chlorine. When two halo groups are present they may be the same as or different from one another. When two D' groups are present, they may be the same as or different from one another.

It is preferable that the tinting solution have a pH of at least 10 and a temperature from approximately 30° C. to 60° C. when applied to the lens. While the raised pH is beneficial, pH alone, without the quaternary ammonium compound as required by the invention will not achieve the improved desired results in tinting.

The following examples will illustrate the present invention. These examples should be reviewed as illustrative only, without in any way limiting the scope of the instant invention.

EXAMPLE 1

Two groups of 10 Cibasoft® HEMA contact lenses (available from Ciba Vision Corporation) were tinted. The first group was placed in a tinting solution containing 1 ml of 0.1% Cibracon® Blue 3R (aq) (a chlorotriazine type dye available from Ciba Geigy Corporation), 1 ml of Na$_3$PO$_4$×12H$_2$O (10% aq) and 0.1 ml of 5.0% tetrabutylammonium bromide. The second group was placed in an identical solution except the tetrabutylammonium bromide was omitted. Both groups were shaken for 30 minutes at 4° C. Each lens was then extracted three times with 10% glycerine at 80° C. for 30 minutes, once in deionized water at 80° C. for 30 minutes, and placed in buffered saline at 80° C. for 1 hour. The pH of the solution without the quaternary ammonium compound was 12.23, while the pH of the solution with it was 12.18.

After extraction, the lenses from the first group having the tetrabutylammonium bromide catalyst visibly had substantially more color than those of the second group without the catalyst.

Transmittance of the invention tinted lens 73%, of the art lens 87%, and of a fresh untinted lens 87%.

EXAMPLE 2

The procedure of Example 1 was repeated using a fresh set of lenses, except that the Cibracon® Blue 3R solution concentration was 0.5%. The lenses were visibly different before extraction and after. The lenses of the first group, which had the catalyst in its tinting solution (pH 12.25), appeared very dark blue before extraction, and retained a distinct blue color even after extraction. The lenses of the second group, which had no catalyst in its tinting solution (pH 12.26), appeared much lighter than the first group lenses before extraction, and became even lighter after extraction.

Transmittance of the invention tinted lens was 67%, of the art tinted lens was 80% and untinted lens was 87%.

EXAMPLE 3

Two groups (Groups I and II) of 5 Softcon ® contact lenses (a HEMA/PVP lens available from American Optical Corporation) were tinted according to the above-described standard procedure at 45° C. Group I was placed in a tinting solution (pH 12.20) comprising 2 mlo f 0.1% of Ramazol ® (a blue dye solution available from Hoechst Celanese Corporation), 2 ml of 10% $Na_3PO_4 \times 12H_2O$ (aq), and 0.2 ml of 5% tetrabutylammonium hydrogen sulfate. The dye solution was prepared by dissolving 0.1 g of a dyestuff having the formula:

> D—$SO_2$—$CH_2$—O—$SO_3Na$ in 99 ml of water and 1 ml of concentrated HCl. Group II was placed in an identical tinting solution except the tetrabutylammonium hydrogen sulfate was omitted (pH 12.30). The lenses were placed for 1 hour in their respective tinting solution, then extracted with 10% glycerine (aq) at 80° C. for two hours. In comparing the two groups after extraction, it was determined that the lenses of Group I, which had the tetrabutylammonium hydrogen sulfate catalyst in their tinting solution, had substantially better coloring than the lenses of Group II.

Absorbance for Group I was 5.61, while absorbance for Group II was 3.00.

EXAMPLE 4

Two groups of 5 Softcon ® contact lenses were tinted according to the above-described standard procedure at 45° C. Group I was placed in a tinting solution (pH 12.18) comprising 2 ml of 0.5% Cibacron ® yellow F-G (available from Ciba Geigy Corporation), 2 ml of 10% $NA_3PO_4 \times 12H_2O$ (aq), and 0.2 ml of 5% tetrabutylammonium hydrogen sulfate. Group II was placed in an identical tinting solution except the tetrabutylammonium hydrogen sulfate was omitted (pH 12.22). The lenses were soaked for 1 hour in their respective tinting solution, then extracted with 10% glycerine (aq) at 80° C. for two hours. In comparing the two groups after extraction, it was determined that the lenses of Group I, which had the tetrabutylammonium hydrogensulfate catalyst in their tinting solution, had substantially better coloring than the lenses of Group II.

Absorbance for Group I was 4.64, while for Group II absorbance was 2.22.

EXAMPLE 5

Two groups of 5 Cibasoft ® HEMA contact lenses each were tinted according to the above-described standard procedure at 45° C. Group I was placed in a tinting solution (pH 12.16) comprising 1 ml of the Ramozol ® blue dye solution (set forth in Example III), 1 ml of 10% $Na_3PO_4 \times 12H_2O$ (aq), and 0.1 ml of 5% tetrabutylammonium bromide (aq). Group II was placed in an identical tinting solution except that the tetrabutylammonium bromide was omitted (pH 12.21). The lenses were soaked for 30 minutes in their respective tinting solution, washed with deionized water and saline, extracted with 100 ml of 10% glycerine (aq) at 80° C. for two hours, washed again with 100 ml deionized water at 80° C. for 1 hour, and placed in 100 ml buffered saline at 80° C. for one hour. The lenses were then examined by visible spectrum. A distinct difference was seen between the groups. Group I, which had the catalyst in its tinting solution, was tinted intensely while Group II, which had no catalyst in its solution, tinted only very faintly.

Transmittance for Group I was 43% while for Group II transmittance was 73%.

EXAMPLE 6

Two groups of 5 Cibasoft ® HEMA contact lenses each were tinted according to the above-described standard procedure at 45° C. Group I was placed in a tinting solution (pH 12.22) comprising 1 ml of 0.05% Cibacron ® Navy F-G (available from Ciba Geigy Corporation), 1 ml of $Na_3PO_4 \times 12H_2O$ (aq), and 0.1 ml of 5% tetrabutylammonium bromide (aq). Group II was placed in an identical tinting solution except that the tetrabutylammonium bromide was omitted (pH 12.25). The lenses were placed for 30 minutes in their respective solution, then washed with deionized water and buffered saline solution, extracted in 100 ml of 10% glycerine (aq) at 80° C. for two hours, washed again in 100 ml of deionized water at 80° C. for one hour. The tinting results were examined by visible spectrum. The lenses of Group I, which were tinted in a solution having the catalyst, possessed a blue color. The lenses of Group II, which were tinted in a solution without a catalyst, had no visible color.

Transmittance for Group I was 62%, while transmittance for Group II was 81%, and transmittance of fresh untinted lenses was 82%.

The above examples illustrate that the process for preparing a contact lens tinted over at least a portion of its surface may be improved by adding a quaternary ammonium salt to the tinting solution.

EXAMPLE 7

Two groups of 5 Cibasoft ® HEMA contact lenses each were tinted according to the above-described standard procedure at 45° C. Group I was placed in a tinting solution (pH 12.20) comprising 1 ml of 0.05% Cibacron ® Navy F-G (available from Ciba Geigy Corporation), 1 ml of 10% $Na_3PO_4 \times 12H_2O$, and 0.1 ml of 5% tetrabutylphosphonium bromide (aq). Group II was placed in an identical tinting solution except that the tetrabutylphosphonium bromide was omitted (pH 12.24). The lenses were placed for 30 minutes in their respective solution, then extracted in 10% glycerine (aq) at 80° C. for two hours, extracted again in deionized water at 80° C. for one hour and then extracted in buffered saline at 80° C. for one hour.

The tinting results were examined visually and by visible spectrum. Visual inspection revealed that the lenses which were tinted in a solution containing tetrabutylphosphonium bromide as catalyst (Group I) were considerably darker blue than the lenses tinted using no catalyst (Group II).

Transmittance for Group I was 6%, while transmittance for Group II was 50%.

Example 7 illustrates that the process for preparing a contact lens tinted over at least a portion of its surface may be improved by adding a quaternary phosphonium salt to the tinting solution.

We claim:

1. An improvement in a process for preparing a soft contact lens tinted over at least a portion of its surface having the steps of forming an aqueous tinting solution comprising a reactive dyestuff and applying said tinting solution to a polymeric hydrogel contact lens material, wherein the improvement comprises adding an effective amount of a quaternary phosphonium salt to said tinting solution before said applying step.

2. The improvement of claim 1, wherein said quaternary phosphonium salt is tetra-($C_1$-$C_4$-alkyl)-phosphonium salt.

3. The improvement of claim 2, wherein said quaternary phosphonium salt is a tetra-($C_1$-$C_4$-alkyl)-phosphonium halide.

4. The improvement of claim 3, wherein said quaternary phosphonium salt is a tetra-($C_1$-$C_4$-alkyl)-phosphonium chloride or bromide.

5. The improvement of claim 4, wherein said quaternary phosphonium salt is a tetra-($C_1$-$C_4$-alkyl)-phosphonium bromide.

6. The improvement of claim 1, wherein said tinting solution comprises a reactive dyestuff of the formulae:

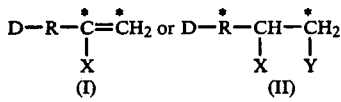

wherein

D is the radical of an organic dyestuff radical;

R is a divalent organic electron attracting group capable of causing electron withdrawal of the carbon atoms to which it is attached directly or through a conjugated system, whereby the carbon atoms are activated, selected from —CO—, —$SO_2$—, —SO—, —NHCO—, $NHSO_2$—, —$SO_2$—NH—;

X is hydrogen or halogen; and

Y is a leaving group selected from —Cl, —Br, —OH, di-lower-alkyl-amino,

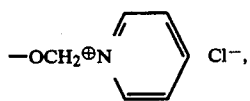

—$OSO_3$—$Z^+$ where Z is a cation, —O—$SO_3R$, or —$OSO_2R_1$ where $R_1$ is alkyl, aryl, aralkyl or alkaryl or mixtures thereof; and said process further comprises the steps of maintaining said solution at a temperature from between approximately 30° to 60° C.; adding contact lens material to said solution; removing said contact lens material from said solution after a preselected time; and removing unreacted solution from said lens material.

7. The improvement of claim 1, wherein said tinting solution comprises a halotriazine dyestuff.

8. The improvement of claim 7, wherein said halotriazine dyestuff is a chlorotriazine dyestuff.

9. The improvement of claim 1, wherein said tinting solution having said quaternary phosphonium salt therein has a temperature from between approximately 30° to 60° C. during said applying step.

10. The improvement of claim 1, wherein said tinting solution having said quaternary phosphonium salt therein has a pH of at least 10 during said applying step.

11. The improvement of claim 1, wherein said contact lens material is hydroxyethyl metacrylate.

12. A contact lens produced by a process which includes the improvement of claim 1.

13. A solution for tinting contact lenses, comprising effective amounts of a reactive dyestuff and a quaternary phosphonium salt.

* * * * *